United States Patent [19]

Mickael

[11] Patent Number: 5,596,191
[45] Date of Patent: Jan. 21, 1997

[54] METHOD AND APPARATUS FOR EPITHERMAL NEUTRON POROSITY MEASUREMENT CORRECTED FOR TOOL STANDOFF AND FORMATION LITHOLOGY

[75] Inventor: Medhat W. Mickael, Sugar Land, Tex.

[73] Assignee: Western Atlas International, Inc., Houston, Tex.

[21] Appl. No.: 445,823

[22] Filed: May 22, 1995

[51] Int. Cl.$^6$ .................................................. G01V 5/10
[52] U.S. Cl. ..................................... 250/269.4; 250/266
[58] Field of Search ...................................... 250/265, 266, 250/269.4, 269.5

[56] References Cited

U.S. PATENT DOCUMENTS

| | | | |
|---|---|---|---|
| 3,774,033 | 11/1973 | Scott et al. | 250/269.4 X |
| 4,760,252 | 7/1988 | Albats et al. | 250/269.5 X |
| 4,972,082 | 11/1990 | Loomis et al. | 250/266 X |
| 5,051,581 | 9/1991 | Hertzog et al. | 250/266 |
| 5,345,077 | 9/1994 | Allen et al. | 250/264 |
| 5,349,184 | 9/1994 | Wraight | 250/269.4 X |

*Primary Examiner*—Carolyn E. Fields
*Assistant Examiner*—Edward J. Glick
*Attorney, Agent, or Firm*—Richard A. Fagin

[57] ABSTRACT

A method of determining porosity of an earth formation penetrated by a wellbore including irradiating the earth formation with bursts of neutrons from a source in the wellbore and counting epithermal neutrons at a first detector axially spaced from the source to be primarily responsive to output of the source. Counting neutrons is divided into buildup periods contemporaneous with the bursts and decay periods between bursts. Neutrons are counted at a second detector during buildup and decay, the second detector axially spaced from the source and radially displaced towards the wellbore to be responsive to epithermal neutrons from the formation and relatively insensitive to lithology. Neutrons are counted at a third detector during burst and decay, the third detector axially spaced from the source and radially displaced towards the wellbore to be primarily responsive to epithermal neutrons from the formation, but the response is partially affected by said lithology. First, second, and third ratios are calculated of counts of the second to first detectors, and third to first detectors, for the burst and decay periods. Porosity is calculated from the third ratio, tool standoff is calculated from the first and said second ratios. In a particular embodiment the first and third ratios can be adjusted for the diameter of the wellbore and fluid salinity by a predetermined relationship and the lithology determined by cross-plotting the adjusted first ratio and adjusted third ratio.

11 Claims, 10 Drawing Sheets

METHOD AND APPARATUS FOR EPITHERMAL NEUTRON POROSITY MEASUREMENT CORRECTED FOR TOOL STANDOFF AND FORMATION LITHOLOGY

BACKGROUND OF THE INVENTION

1. Field of the Invention

The present invention is related to the field of electric wireline well logging instruments used to measure porosity of an earth formation. More specifically, the present invention is related to instruments used to measure formation porosity by making measurements of epithermal neutron activity.

2. Description of the Related Art

Wellbores are drilled through earth formations for the purpose, among others, of extracting oil and gas. If present in a particular earth formation, the oil and gas typically exist within voids, or pore spaces in the formation. Various types of instruments have been devised to make measurements from within the wellbore of the fractional formation volume occupied by the pore spaces and the fluid content of those pore spaces within the particular earth formation.

The various instruments are typically lowered into the wellbore at one end of an armored electrical cable. Sensors in the instruments make various measurements and transmit signals to recording equipment located at the earth's surface, where the signals can be decoded and convened into the measurements of interest.

One type of instrument known in the an for measuring the fractional volume of pore space is an epithermal neutron porosity tool. The epithermal neutron porosity tool typically includes an externally controllable, pulsed source of high energy, or fast, neutrons and one or more neutron detectors which can be selectively sensitized to neutrons which have dropped in energy content to the so-called epithermal level. Fast neutrons emanating from the source can collide with atomic nuclei in the earth formation. At each collision, some of the energy of the fast neutrons can be lost by transfer of momentum to the colliding nuclei. The fast neutrons are slowed by these collisions until they drop in energy to the epithermal, and then the thermal level, whereupon some of the neutrons can be absorbed by certain materials in the earth formation, such as chlorine, which have a propensity to absorb thermal neutrons.

Transfer of neutron momentum is most efficient, and therefore occurs in the shortest time and distance from the source, when neutrons collide with subatomic particles of substantially the same mass as the neutron. In earth formations, subatomic particles close in mass to neutrons typically are hydrogen nuclei present in the fluids, which can exist in the pore spaces. Higher fractional pore volume in a particular formation, and the associated higher fluid content per unit volume of that formation, typically results in shorter slowing-down-length and shorter die-away time due to the higher concentration of hydrogen nuclei.

Some epithermal neutron tools known in the art can make measurements corresponding to the amount of time taken for the neutrons to slow down to the epithermal energy level, these tools making measurements in order to determine a so-called "die-away" rate. Other tools known in the art can make measurements corresponding to the number of epithermal neutrons at various distances from the source, these tools being so-called "slowing-down-length" measuring instruments. Still other tools known in the art can combine die-away and slowing-down-length measurements in order to determine the fractional volume of pore space, which measurements are corrected for certain effects of the wellbore environment.

An epithermal neutron die-away measurement tool known in the art is described, for example in U.S. Pat. No. 5,345,077 issued to Allen et al. The tool in the Allen et al '077 patent includes a pulsed source of high energy neutrons and a detector mounted in a pad on an extensible arm, the detector being adapted to measure epithermal neutrons at a plurality of time intervals from the time the source is "pulsed" to irradiate the formation with a "burst" of fast neutrons.

The detector measurements in the tool disclosed in the Allen et al '077 patent are compared with models of epithermal neutron die-away using exponential terms varying as the sum of detected counting rate components caused by neutrons entering the detector from the wellbore, from the earth formation, and the so-called "thermal background" which results from the detector having at least some residual sensitivity to thermal neutrons. Exponentially weighted moments of the die-away measurements and the model are determined and equated. The equated moments are solved for the ratio of amplitudes of the wellbore component to the formation component. The formation component is determined from weighted moments of the formation and thermal decay components. The determined formation component is used to generated a die-away "constant" which is indicative of the fractional pore volume of the formation. The constant is used in trained neural network computation to generate a neutron porosity corrected for the "standoff" of the detector from the wall of the wellbore.

In the tool of the Allen et al '077 patent the detector is mounted in the pad in order to reduce the effect of irregularities in the surface of the wellbore. Irregularities in the surface of the wellbore can cause error in the epithermal neutron measurements because the wellbore is typically filled with liquid. Liquid in the wellbore slows down the fast neutrons in a very short time and can therefore cause the formation to be irradiated with widely variable numbers of fast neutrons. Subsequent measurements of epithermal neutrons by the detector may be affected by the variations in the original numbers of fast neutrons imparted to the formation.

A drawback to the method and apparatus of the Allen et al '077 patent is that the measurements made by the detector must be compared in a trained neural network to laboratory model measurements in order to generate a porosity measurement which is corrected for the effects of the wellbore, or standoff. If the measurements made by the tool of the Allen et al '077 patent within a particular wellbore should occur outside of the range of the laboratory measurements, then the porosity and standoff values predicted using the neural network can be erroneous. An additional drawback to the method of the Allen et al '077 patent is that the measurements made by the tool are particularly sensitive to the amount of tool standoff. Slight error in determination of standoff can result in significant error in determining the amount of standoff correction to the porosity determination.

It is yet another drawback to the tool disclosed in the Allen et at '077 patent that the porosity measurements made by the tool is subject to relatively large amounts of statistical uncertainty and this uncertainty increases with the amount of standoff. At certain amounts of standoff, the amount of statistical uncertainty can make the measurement relatively difficult to use.

A further drawback to the tool disclosed in the Allen et al '077 patent is that the detector is mounted in the pad on the extensible arm. Construction of an instrument having such an articulated pad can be difficult and expensive, and the measurements made by the tool are still subject to variations in the number of fast neutrons entering the formation since the source is mounted on a substantially centralized tool mandrel. The tool mandrel is subject to variations in the distance between itself and the wellbore wall, which because of the liquid in the wellbore, can cause variation in the number of fast neutrons actually irradiating the formation.

Another epithermal neutron tool is disclosed, for example, in U.S. Pat. No. 5,051,581 issued to Hertzog et al. The tool in the Hertzog et al '581 patent includes a pulsed neutron source and epithermal neutron detectors at axially spaced-apart locations from the source. The epithermal neutron population following the source burst is measured at two of the detectors in order to determine the epithermal neutron slowing-down-length, and the epithermal neutron die-away rate is determined by measurements from the third detector. The slowing down length is relatively insensitive to the effects of the wellbore and tool standoff, and the die-away measurement highly sensitive to the wellbore and standoff, but is only slightly affected by the material composition, called the lithology, of the earth formation. Values of apparent formation porosity for calculated by the slowing-down-length and from the die-away are compared according to an empirical relationship relating apparent porosities to a stand-off corrected value of formation porosity.

A drawback to the method and apparatus disclosed in the Hertzog et al '581 patent is that while the slowing-down-length measurement is relatively insensitive to the effects of the wellbore and tool standoff, this measurement is affected by the formation lithology; and the die-away measurement, while relatively insensitive to formation lithology, is still somewhat affected by the lithology. Therefore the tool according to the Hertzog '581 patent provides a formation porosity measurement which is at least partially sensitive to formation lithology. The die-away measurement used in the tool disclosed in the Hertzog et al '581 patent is also subject to relatively large statistical uncertainty, making porosity thus determined less useful than porosity determined by other means.

Accordingly, it is an object of the present invention to provide a method and apparatus for determining the formation porosity using an epithermal neutron tool which is relatively insensitive both to tool standoff and to the formation lithology, and therefore can more easily be corrected for standoff and lithology.

SUMMARY OF THE INVENTION

The present invention is a method of determining the porosity of an earth formation penetrated by a wellbore. The method includes the steps of irradiating the earth formation with bursts of neutrons from a source in 1a logging tool inserted into the wellbore, and counting epithermal neutrons at a first detector axially spaced apart from the source to be primarily responsive to neutron output of the source. Counting neutrons is time divided into buildup periods contemporaneous with the bursts and decay periods between the end of the bursts and the beginning of the successive bursts. Neutrons are counted at a second detector during buildup and decay periods. The second detector is axially spaced from the source and radially displaced towards the wellbore so as to be responsive to epithermal neutrons entering the second detector from the formation. The second detector axial spacing provides relative insensitivity of response to lithology. Neutrons are counted at a third detector during the burst and decay periods. The third detector is axially spaced from the source and radially displaced towards the wellbore so as to be primarily responsive to epithermal neutrons entering the detector from the formation, but the response is partially affected by lithology. First, second and third ratios are calculated, respectively, of counts of the second to first detectors for the burst and decay periods, and third to first detectors for the burst and decay periods. Porosity is calculated from the third ratio, tool standoff is calculated from the first and said second ratios. In a particular embodiment the first and third ratios can be adjusted for the diameter of the wellbore and fluid salinity by a predetermined relationship and the lithology determined by cross-plotting the adjusted first ratio and adjusted third ratio.

DESCRIPTION OF THE PREFERRED EMBODIMENT

Figure 1:
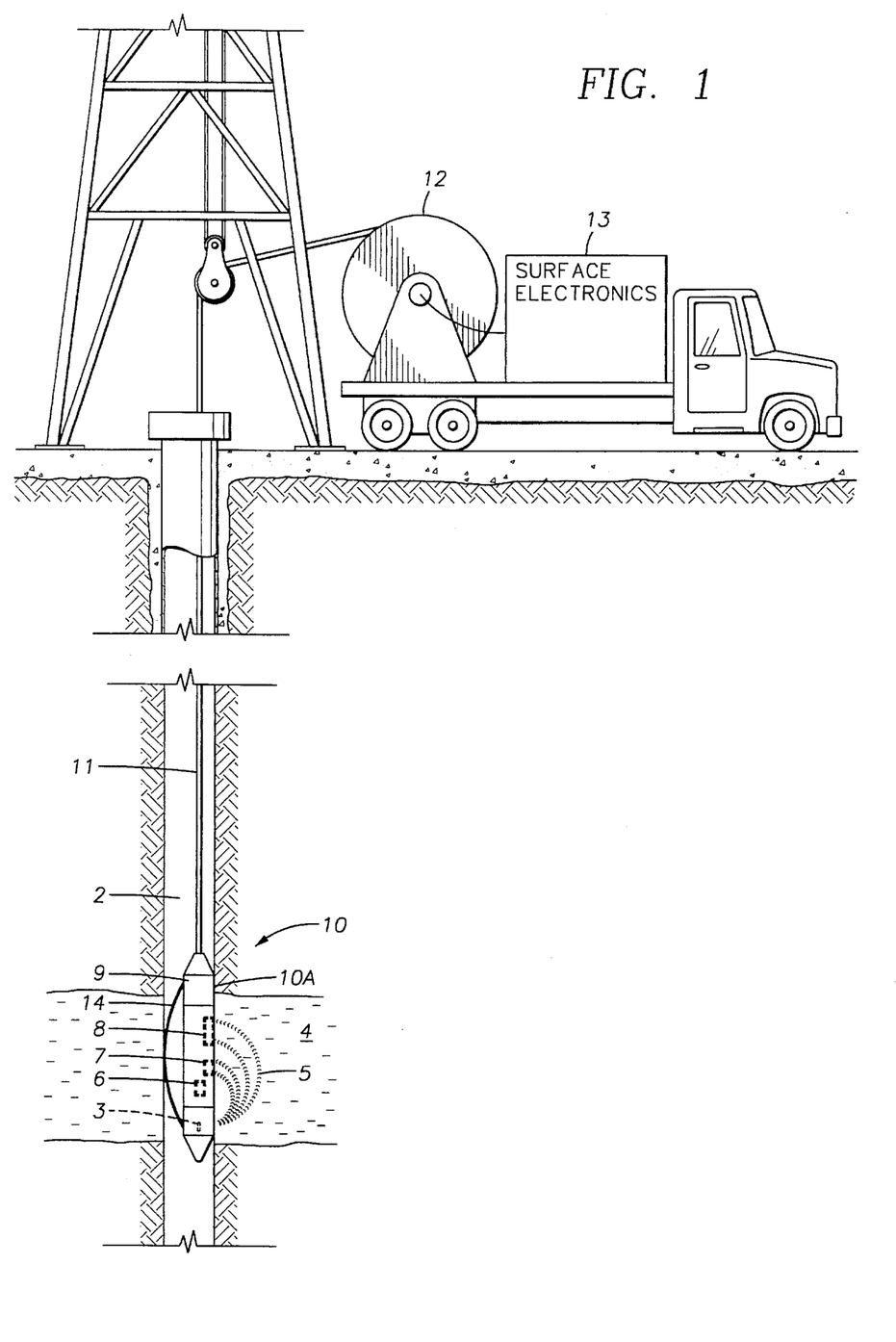
FIG. 1 shows a logging tool according to the present invention being lowered into a wellbore penetrating earth formations.

FIG. 1 shows an epithermal neutron porosity logging tool 10 according to the present invention as it is typically used in a wellbore 2 penetrating an earth formation 4. The tool 10 can be lowered into the wellbore 2 at one end of an armored electrical cable 11. The cable 11 can be extended into the wellbore by means of a winch 12 or similar spooling device known in the art. The other end of the cable 11 is electrically connected to surface electronics 13 which can include recording systems (not shown separately) for generating a record, with respect to depth in the wellbore 2, of measurements made by the tool 10 which are transmitted along the cable 11.

The tool 10 includes a source of fast neutrons 3, which in the present embodiment can be a controllable accelerator-type source familiar to those skilled in the art. The source 3 is typically disposed within a sealed, elongated housing 10A adapted to traverse the wellbore 2. Also disposed inside the housing 10A are a first detector 6, a second detector 7 and a third detector 8. The detectors 6, 7, 8 are adapted to be responsive to epithermal neutrons, as will be further explained. An eccentralizing device, shown at 14, is typically attached to the housing 10A to cause one side of the housing 10A to be urged into contact with the wall of the wellbore 2. The eccentralizing device 14 can be a bowspring or other eccentralizing device known to those skilled in the art.

The source 3 periodically emits short-duration pulses, or "bursts" of fast neutrons, shown generally at 5. The neutrons 5 interact with the atomic nuclei of the formation 4 and, among other things, are slowed down by atomic nuclei within the formation 4 with which the neutrons 5 collide. Some of the neutrons 5 can be deflected upon collision back towards one of the detectors 6, 7, 8 whereupon they may be detected. Each detector 6, 7, 8 is electrically connected to a telemetry unit 9 which imparts signals to the cable 11 corresponding to detections of neutrons at each one of the detectors 6, 7, 8. The signals can be decoded in the surface electronics 13 in order to determine the numbers of neutrons detected by each one of the detectors 6, 7, 8.

Figure 2:
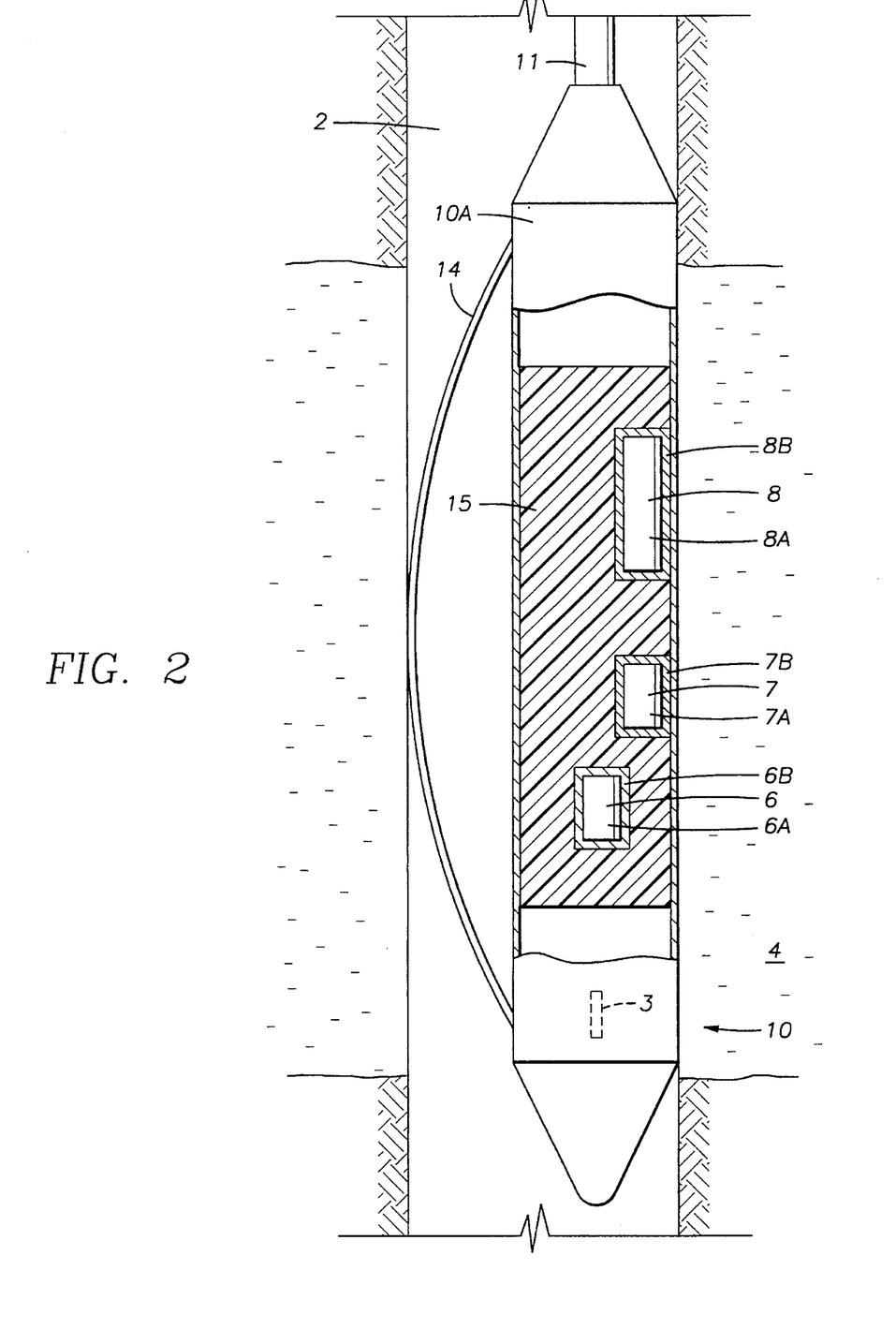
FIG. 2 shows a detailed cross-section of the construction of the tool according to the present invention.

FIG. 2 shows the tool 10 in more detail so that its operation can be better understood. As a matter of convenience, the source 3 is typically disposed near one end of the housing 10A, substantially coaxially with the housing 10A. The source 3 can provide bursts of neutrons having an energy of about 14 million electron volts ("MeV"). The bursts typically repeat at a rate of about 10 kHz and each burst has a duration of about 20 microseconds.

The first detector 6 comprises a first helium-3 proportional counter 6A. Helium-3 proportional counters are known in the art for detecting thermal neutrons and epithermal neutrons, and provide an electrical voltage pulse each time a neutron is detected inside the counter. The first counter 6A can be shaped cylindrically having a diameter of about 1.5 inches and a length of about 2 inches. Helium-3 gas in the first counter 6A can be pressurized to about 10 atmospheres (147 PSIA). The center of the first counter 6A can be located about 6 inches from the source 3. The first counter 6A can be located substantially coaxially with the source 3 along the axis of the housing 10A. The axial spacing of the first detector 6 is selected to make the first detector 6 responsive primarily to the neutron output from the source 3, and as will be further explained, counts from the first detector 6 are used to normalize counts from the second 7 and the third 8 detectors for small variations in the neutron output of the source 3. The first counter 6A is covered by cadmium foil 6B which will be further explained.

The second detector 7 can include a second helium-3 proportional counter 7A. The second counter can be pressurized to about 10 atmospheres (147 PSIA). The second counter 7A can be about 1.5 inches diameter and about 4 inches length, and can have its center located at an axial spacing from the source 3 of about 9.5 inches. The axial spacing of the second counter 7A is selected to provide the second detector 7 with a response which has some sensitivity to formation porosity but has relatively little sensitivity to formation lithology. The center of the second counter 7A can be radially displaced toward one side of the housing 10A, so that the counter 7A as covered in cadmium foil 7B (which will be further explained) contacts the inner wall of the housing 10A.

The third detector 8 can include a third helium-3 counter 8A. The third counter can be about 2 inches diameter, about 8 inches long and pressurized to about ten atmospheres. The third counter 8A can have its center axially spaced form the source 3 by about 22 inches. The third counter 8A is also radially displaced towards the same side of the inner wall of the housing 10A as is the second counter 7A. The axial spacing of the third counter 8A is selected to make the response of the third detector 8 primarily sensitive to formation porosity and partially sensitive to formation lithology. The third counter 8A is also wrapped in cadmium foil 8B.

As previously stated, the counters 6A, 7A, 8A can each be wrapped in cadmium metal foil, shown as 6B, 7B, 8B, respectively, each cadmium foil having a thickness of about 0.05 inches. The cadmium foil 6B, 7B, 8B tends to absorb thermal neutrons which come into contact with the foil, while allowing relatively unimpeded passage of epithermal or higher energy neutrons. The counters 6A, 7A, 8A as wrapped in the cadmium foil 6B, 7B, 8B, respectively, are therefore primarily sensitive to epithermal neutrons, since the counters themselves are sensitive primarily to thermal and epithermal neutrons, and the thermal neutrons are substantially excluded from each counter by the foil wrapped thereon.

Substantially the entire inside volume of the housing 10A located between the first detector 6 and the third detector 8 can be filled with a neutron moderating material, shown generally at 15 and hereinafter called the moderator. The moderator 15 is composed of a material having a high neutron scattering cross-section. The moderator 15 provides rapid slowing-down of higher energy neutrons which enter the housing 10A in the vicinity of the detectors 6, 7, 8 so that these neutrons can be absorbed by the cadmium foil 6B, 7B, 8B. A high neutron scattering cross-section is typically a property of materials having a high concentration of hydrogen nuclei, particularly materials such as plastic. Polypropylene is a preferred material for the moderator 15.

Since the second detector 7 and the third detector 8 are radially displaced towards the wall of the housing 10A, and the eccentralizing device 14 is attached to urge that same wall of the housing 10A into contact with the wall of the wellbore 2, substantially none of the moderator 15 impedes passage of neutrons entering the second 7 and third 8 detectors from the formation 4. In this way the second 7 and third 8 detectors are made primarily sensitive to epithermal neutrons entering the tool 10 from the formation 4.

The construction of the tool according to the present invention having been explained, the manner of determining formation 4 porosity from the detector measurements will now be explained.

Figure 3:
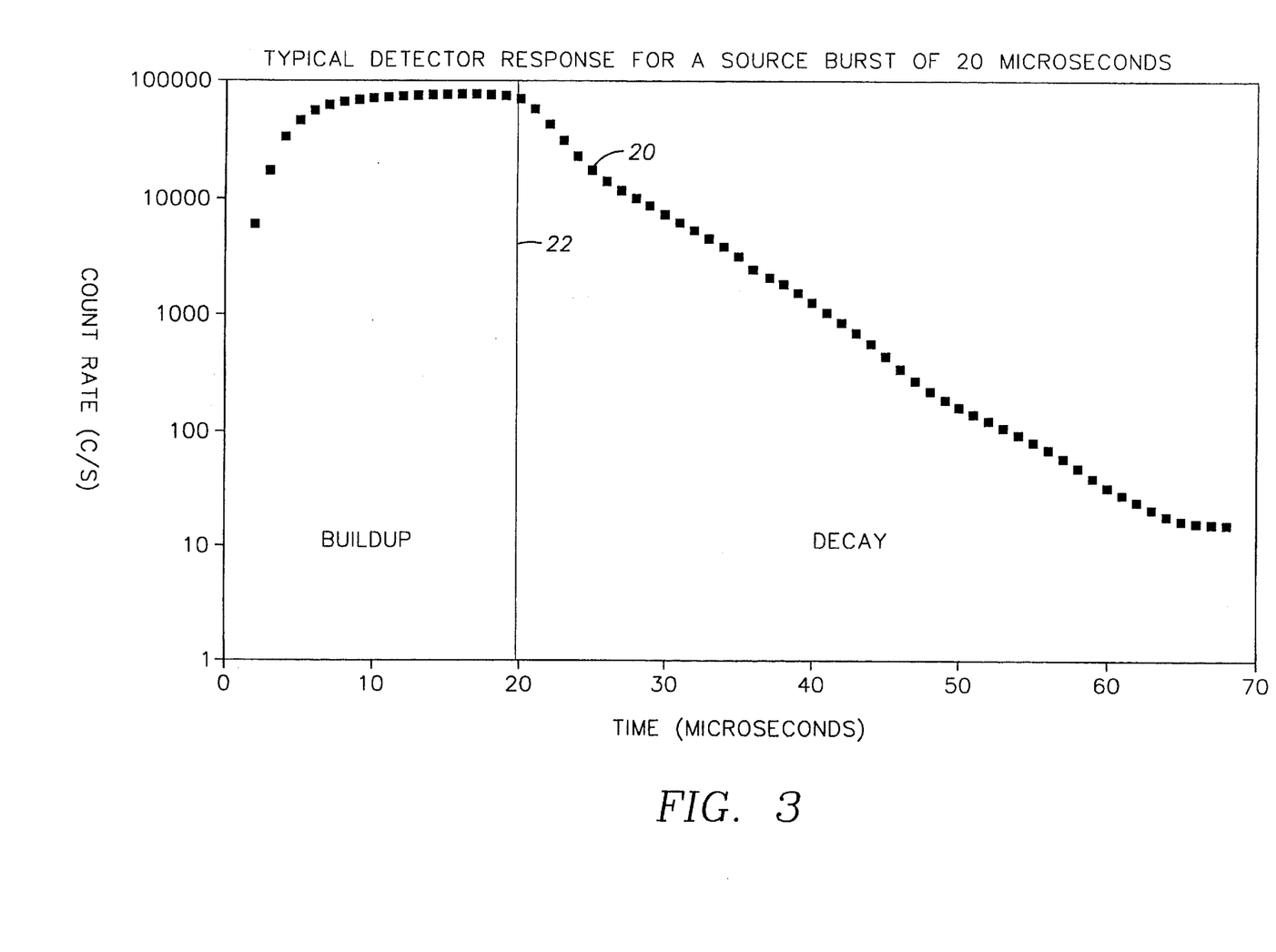
FIG. 3 shows a graphic representation of detector count rate with respect to time for an epithermal neutron detector of the tool of the present invention.

FIG. 3 shows a curve 20 representing counting rate for one of the detectors (such as 7 or 8 in FIG. 2) both during and after the neutron burst from the source (shown as 3 in FIG. 2). A portion of the curve 20, which takes place primarily during the burst and is indicated by a time interval designated with reference numeral 23, exhibits rapidly increasing count rate that gradually levels off to a nearly steady count rate occurring near the end of the burst. After the burst stops, shown at 22, the counting rate decreases. The count rate increase during the burst is affected primarily by the slowing-down length of the formation (shown as 4 in FIG. 1), because neutron interaction with atomic nuclei in the formation 4 causes some of the high energy neutrons to slow down to a detectable energy level. High energy neutrons therefore are the primary source of the neutrons which are counted during the burst.

The count rate following cessation of the burst, as shown at 22, is primarily affected by the formation 4 die-away time since no new high energy neutrons are being introduced into the formation 4. It is primarily lower energy neutrons that contribute to the counting rate after the burst is stopped.

The fact that different energy level neutrons affect the overall counting rate of a detector during the burst, as opposed to after the burst, can be used to make a measurement related to the standoff of the tool. When tool standoff exists, a layer of fluid (not shown separately) from the wellbore (shown as 2 in FIG. 1) can be interposed between the wall of the wellbore 2 and the housing (shown as 10A in FIG. 2). The fluid has a greater neutron slowing-down power than does the formation (shown as 4 in FIG. 1) primarily because the fluid will typically have a much higher hydrogen nucleus concentration than does the formation 4. During the burst, the fluid will cause some of the fast neutrons to lose energy, but a substantial number of the neutrons will still retain enough energy to be detected. On the other hand, neutrons which are slowed by the fluid after the burst has stopped typically can lose enough energy so that they fall below the thermal energy level threshold and can be absorbed by the cadmium foil, (such as 6B, 7B, 8B in FIG. 2) and therefore are not detected. The count rate response during the burst is therefore much less affected by standoff than is the count rate response during the die-away after the burst is stopped. A comparison of the counts at a particular detector during the burst to the counts at that detector after the burst is indicative of tool standoff.

In the present embodiment of the invention, counts at each of the three detectors (6, 7, 8 in FIG. 2) are recorded during the burst and are recorded after the burst up to the time of initiation of the subsequent burst. Ratios are determined for the counts at the first detector 6 (hereinafter referred to as the very short spacing detector—VSS for convenience) to the second detector 7 (hereinafter referred to as the short spacing detector—SS for convenience) during the burst. This ratio will be referred to hereinafter as $(VSS/SS)_{buildup}$. The same detector count ratio is determined for the counts measured after the burst is stopped, that ratio hereinafter referred to as $(VSS/SS)_{decay}$. A ratio is also determined for the counts measured during the burst for the VSS detector to counts of the third detector 8 (hereinafter referred to as the long spacing detector—LS for convenience) measured during the burst. This ratio is referred to hereinafter as $(VSS/LS)_{buildup}$. A similar ratio is determined for the VSS to LS counts measured after the burst, this ratio hereinafter referred to as $(VSS/LS)_{decay}$.

As previously stated, ratios of counts at the SS and LS detectors relative to the counts at the VSS detector are made in order to normalize the counts measured by the SS and LS detectors for minor variations in the output of the source (shown as 3 in FIG. 2). The axial spacing from the source 3 and the position of the VSS detector relatively centralized in the housing 10A are selected to make the VSS detector primarily sensitive to the source 3 rather than the formation 4 or wellbore 2. It is to be understood that the use of the first detector 6 and the calculation of count ratios in the present embodiment of the invention is particularly for the purpose of normalizing the counts of the second 7 and third 8 detectors for variations in source output. It is contemplated that other methods of normalizing the counts such as statistical processing of the numbers of counts recorded at the second 7 and third 8 detectors could also accomplish the objective of count normalization.

Figure 4:
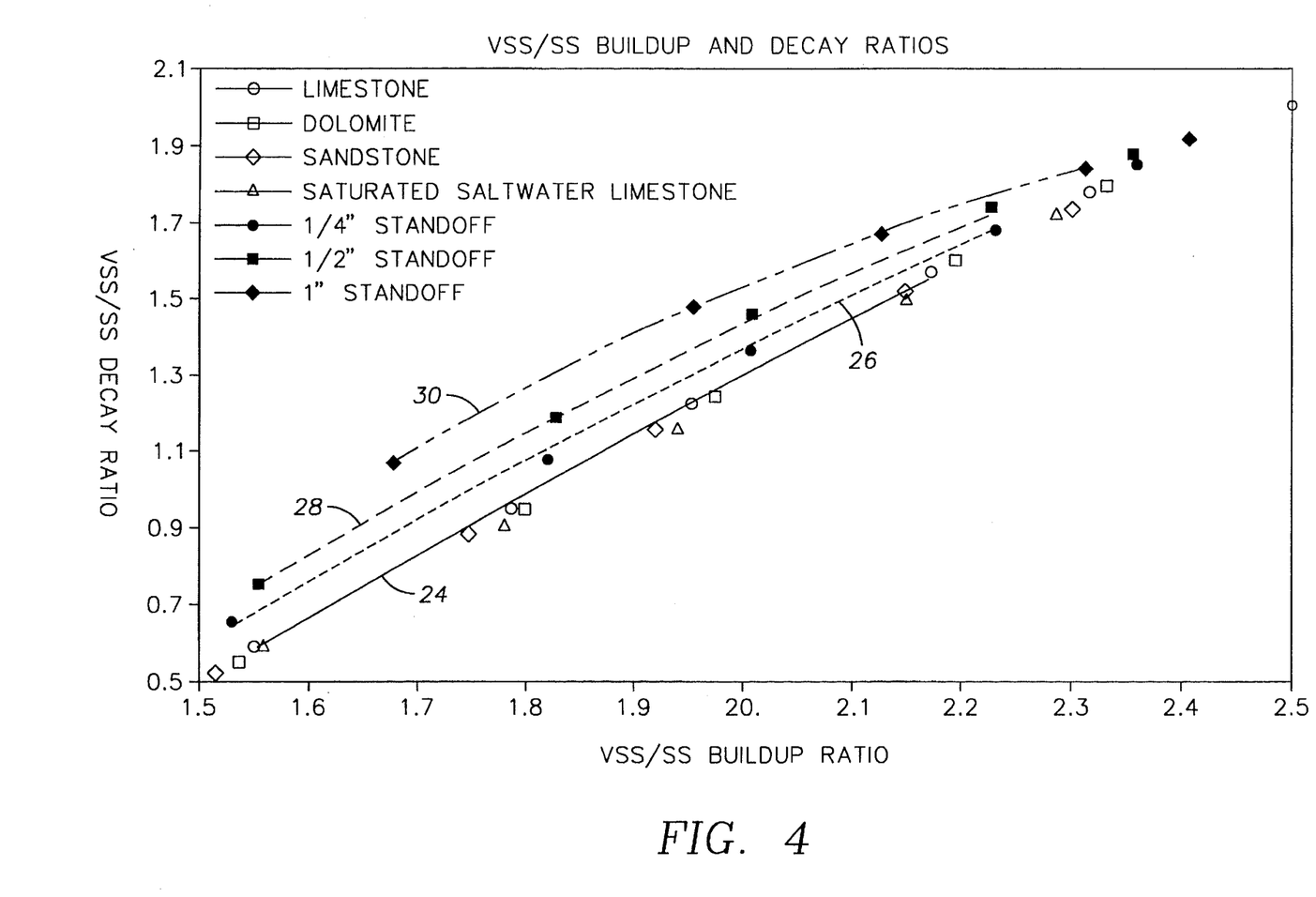
FIG. 4 shows a cross-plot of count ratios of a short-spaced (SS) detector to a very-short-spaced (VSS) detector during burst and decay to show standoff effect.

The $(VSS/SS)_{buildup}$ and $(VSS/SS)_{decay}$ ratios are substantially equally affected by the wellbore 4 and by the formation 4 lithology. However, as previously explained, the $(VSS/SS)_{buildup}$ ratio is much less affected by tool standoff than is the $(VSS/SS)_{decay}$ ratio. A cross-plot of the ratios can determine the amount of tool standoff independent of any effects of the formation lithology or the wellbore. FIG. 4 shows a graphic representation of a cross-plot of the $(VSS/SS)_{buildup}$ and $(VSS/SS)_{decay}$ ratios for a Monte Carlo simulation of the tool 10 configured as shown in FIG. 2. Monte Carlo simulation is known in the an for simulating the response of nuclear particle interactions and the indications of radiation detectors responsive to those interactions.

The Monte Carlo simulation was conducted for a tool 10 configured according to FIG. 2, at zero standoff from the wall of the wellbore 2, within several different simulated formations having different lithologies as indicated by curve 24. In another case a simulation was made for a tool 10 configured as shown in FIG. 2, and positioned in a wellbore penetrating a limestone formation. The simulation was generated for tool standoff values of ¼, 1/2 and 1 inch, as indicated at curves 26, 28, and 30, respectively. The response shown in curve 24 indicates that the $(VSS/SS)_{buildup}$ and $(VSS/SS)_{decay}$ ratios are both relatively insensitive to differences in formation lithology. Curves 26, 28, and 30 show that the $(VSS/SS)_{buildup}$ and $(VSS/SS)_{decay}$ ratios are correspondent to standoff.

A generalized relationship describing the standoff amount S is shown as:

$$\left(\frac{VSS}{SS}\right)_{decay} = (A_1 + A_2 S + A_3 S^2) + \tag{1}$$
$$(B_1 + B_2 S + B_3 S^2)\left(\frac{VSS}{SS}\right)_{buildup} +$$
$$(C_1 + C_2 S + C_3 S^2)\left(\frac{VSS}{SS}\right)_{buildup}^2$$

where the A's B's and C's are constants determined empirically for a least-squares fit of the ratios for known values of tool standoff. In the present embodiment of the invention, the A's B's and C's can be determined by Monte Carlo simulation and then used in calculations performed in the surface electronics (shown as 13 in FIG. 1) when the tool 10 is in use in the wellbore 2 to estimate the standoff by solving equation (1) for S.

Figure 5:
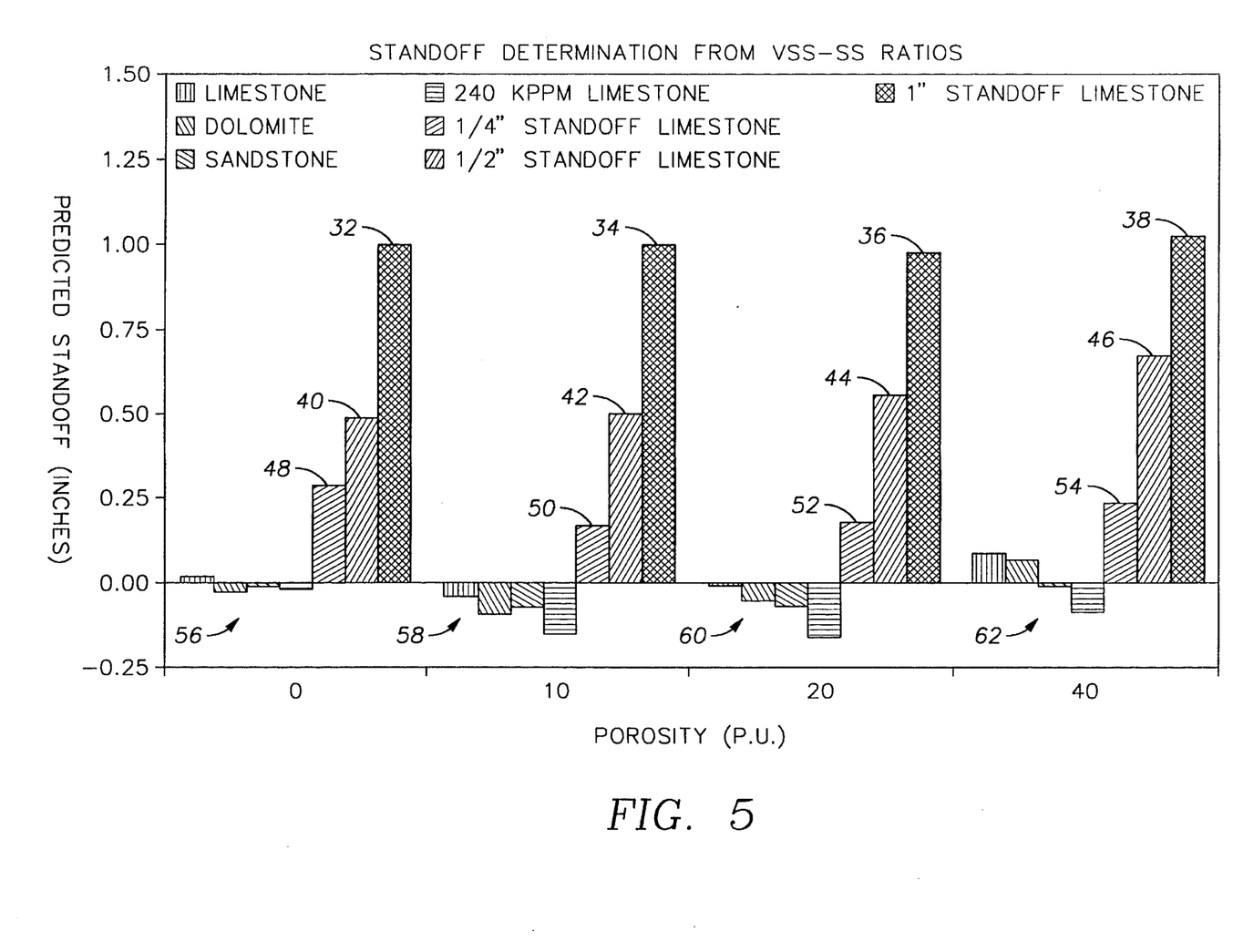
FIG. 5 shows a comparison of ratio estimated standoff compared to actual standoff.

FIG. 5 shows a comparison of tool standoff estimated using the solution to equation (1) from the $(VSS/SS)_{buildup}$ and $(VSS/SS)_{decay}$ ratios for various laboratory simulations involving known values of standoff in various formation lithology types and at various values of formation porosity. Graph bars 32, 24, 36, and 38, respectively, indicate the ratio estimated standoff for the tool 10 positioned at one inch actual standoff for limestone formation having zero, 10, 20 and 40 percent porosity. Graph bars 40, 42, 44, and 46 respectively indicate the ratio calculated standoff for the tool at ½ inch actual standoff in the same porosity limestone formations. Similarly, graph bars 48, 50, 52, and 54 indicate ratio calculated standoff for the tool having actual standoff of ¼ inch. Graphs bars at 56, 58, 60 and 62 indicate the calculated standoff with the tool at zero standoff, but for various type of lithology such as sandstone limestone and dolomite, as well as limestone having salt water filling its pore spaces, wherein the salt water has a chloride ion concentration of 240,000 parts per million (ppm). The salt water simulation was performed to indicate the degree of sensitivity of the standoff estimation to salinity of the fluid in the formation pore space. The response indicated by the graph bars of FIG. 5 demonstrate that the standoff calculated by the count ratios typically does not exhibit more than 0.1 inches total sensitivity to formation water salinity and formation lithology. Thus it is possible to directly determine the tool standoff. The calculated amount of standoff is used to generate a standoff corrected $(VSS/SS)_{buildup}$ ratio, the use of which will be further explained.

Formation porosity is initially determined from the counts made by the third, or LS detector (shown as 8 in FIG. 2). As previously explained, the LS detector is axially spaced apart from the source (shown as 3 in Figure), and is radially displaced towards the wall of the housing 10A in contact with the wall of the wellbore 2 in order to be primarily responsive to epithermal neutrons entering the tool 10 from the formation 4. The previously described $(VSS/LS)_{buildup}$ ratio can readily be determined since the counts for the LS and VSS detectors during the burst are already measured. The $(VSS/LS)_{buildup}$ ratio is primarily related to the epithermal slowing-down-length of the formation 4, which is related to porosity. The $(VSS/LS)_{buildup}$ ratio relationship with respect to porosity has been determined by Monte Carlo simulation and is displayed as a curve shown at 64 in FIG. 6.

The axial spacing of the LS detector from the source 3, although resulting in detector response primarily based on porosity, is such that the LS detector response is somewhat affected by formation 4 lithology. The response of the second, or SS detector (shown as 7 in FIG. 2) however, is much less affected by formation 4 lithology than is the LS detector response because of the selected axial spacing from the source 3. A cross-plot of the $(VSS/LS)_{buildup}$ ratio with the $(VSS/SS)_{buildup}$ ratio can provide an indication of the formation lithology. A graphic representation of such a ratio cross-plot can be observed by referring to FIG. 7. Response curves show the best fit of the responses of the $(VSS/LS)_{buildup}$ ratio on the coordinate axis and the $(VSS/SS)_{buildup}$ ratio on the ordinate axis, for various values of formation porosity, on a dolomite curve at 66, on a limestone curve at 68 and on a sandstone curve at 70.

Figure 7:
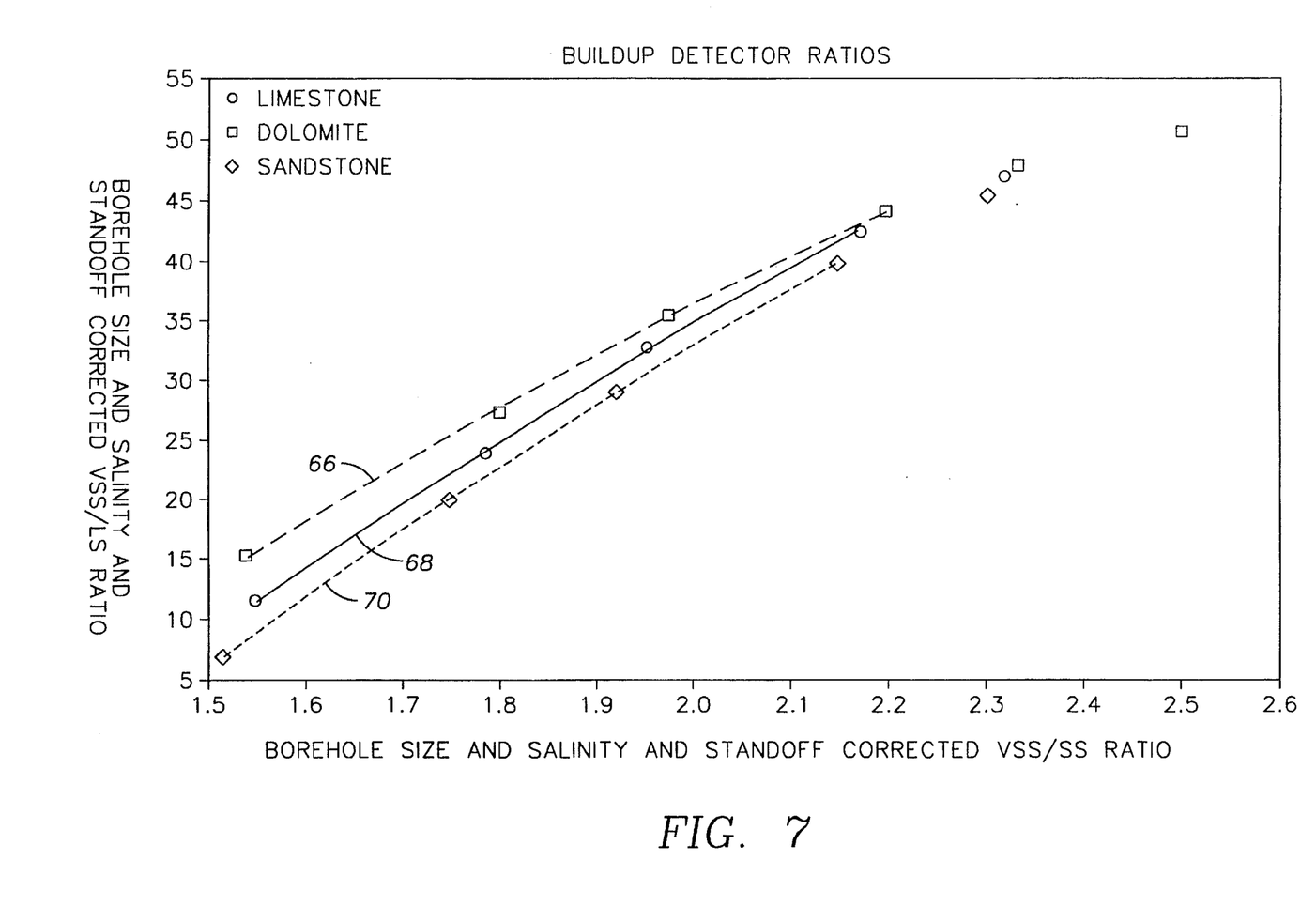
FIG. 7 shows effect of lithology on VSS/SS and VSS/LS burst ratios.
Figure 8:
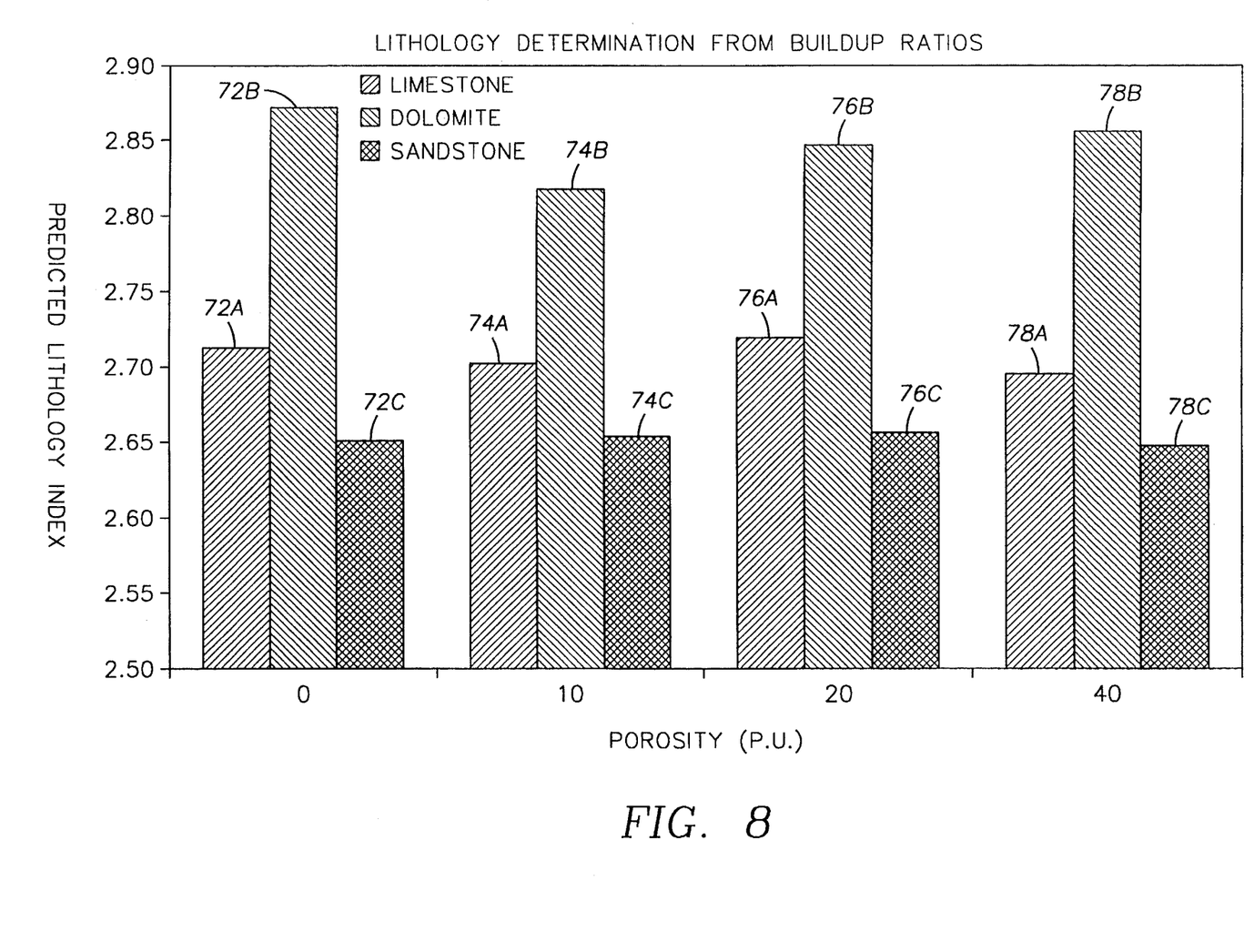
FIG. 8 shows a comparison of ratio calculated lithology to actual lithology.

Using a calculation based on a cross-plot similar to the ones shown in FIG. 7 it is possible to generate a lithology-adjusted value of porosity and generate an estimate of the formation matrix density. The validity of the formation lithology estimation was tested by Monte Carlo simulation for several discrete values of formation porosity, the results of which simulation are displayed in FIG. 8. Graph bars at 72A, 72B and 72C, for example, show the ratio calculated lithology, expressed in terms of the bulk density in grams per cubic centimeter (g/cc) of the material composition of the formation, respectively for limestone, dolomite and sandstone formations. As is understood by those skilled in the art, an apparent matrix density of 2.65 g/cc generally is indicative of sandstone, 2.71 g/cc indicates limestone, and 2.87 g/cc is indicative of dolomite. Corresponding graph bars for simulations for formations having porosities of 10, 20 and 40 percent, respectively, can be observed at 74A-B-C, 76A-B-C, and 78A-B-C. In every case there is substantial agreement between the estimated lithology and the actual lithology.

Figure 9:
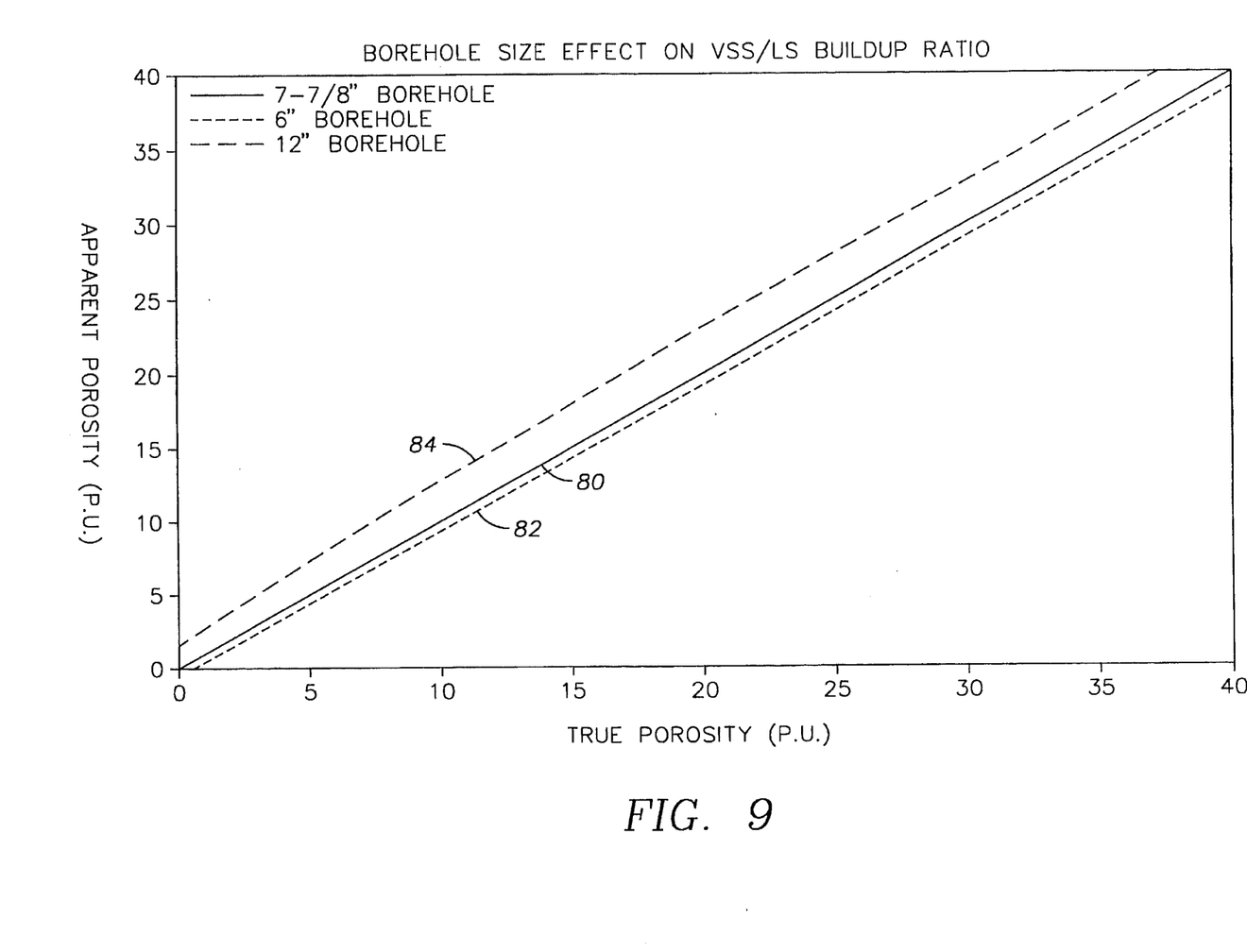
FIG. 9 shows the effect of wellbore size on the VSS/LS burst ratio.

Although the axial spacings of the LS and SS detectors from the source 3 provide that the responses of these detectors are relatively insensitive to differences in certain environmental variables such as fluid salinity and diameter of the wellbore 2, the detector responses can be adjusted for the effects of changes in these variables. For example, a Monte Carlo simulation of the change in calculated porosity from the $(VSS/LS)_{buildup}$ ratio with respect to change in diameter of the wellbore 2 can be observed by referring to FIG. 9. Curves 80, 82 and 84 in FIG. 9 represent the simulated measured porosity compared to the true porosity for the tool 10 configured according to FIG. 2 inserted in a 7.875 inch, 6 inch and 12 inch wellbore, respectively. The empirical relationships of the curves 80, 82, 84 in FIG. 9 can be programmed into the surface electronics (shown as 13 in FIG. 1) to correct the $(VSS/LS)_{buildup}$ ratio derived porosity for the size of the wellbore 2. As is known by those skilled in the art, the size of the wellbore 2 can be determined by using a device such as a caliper (not shown) adapted to be connected to the tool 10.

Figure 10:
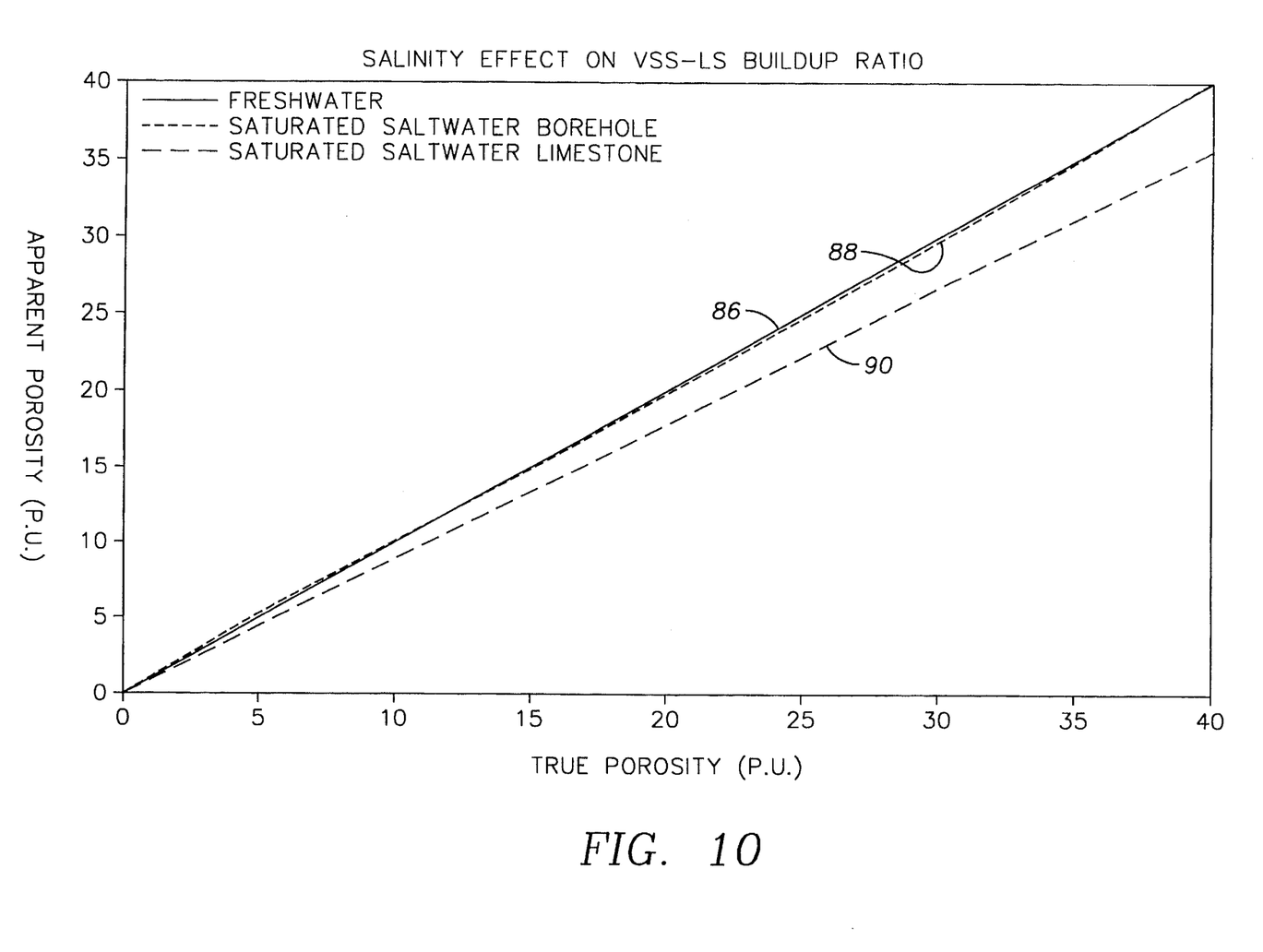
FIG. 10 shows the effect of fluid salinity on the VSS/LS burst ratio.

FIG. 10 shows a graphic representation of a Monte Carlo simulation of the porosity response of the tool 10 configured as in FIG. 2 to fresh water in the wellbore shown as curve 86, salt-saturated water in the wellbore shown as curve 88, both of which include fresh water in the pore spaces of the formation, and at curve 90, the formation pore space is filled with salt-saturated water. As in understood by those skilled in the art, amounts of water salinity in the formation pore spaces are typically unknown before any measurements are made in the formation. It is typically necessary to estimate the salinity. As can be observed in FIG. 10, however, the maximum salinity effect is typically less than 10 percent of the total porosity measurement. The salinity correction as determined by application of the empirical relationships shown graphically in FIG. 10 can be programmed into the surface electronics 13 to correct the porosity as determined by the $(VSS/LS)_{buildup}$ ratio.

The surface electronics (shown as 13 in FIG. 1) in the present embodiment of the invention can be programmed to calculate formation porosity and lithology from the various detector counts according to the following scheme:

A ratio of VSS/SS counts is calculated for the burst interval.

A ratio of VSS/SS counts is calculated for the decay interval.

A ratio of VSS/LS counts is calculated for the burst interval.

A ratio of VSS/LS counts is calculated for the decay interval.

Figure 6:
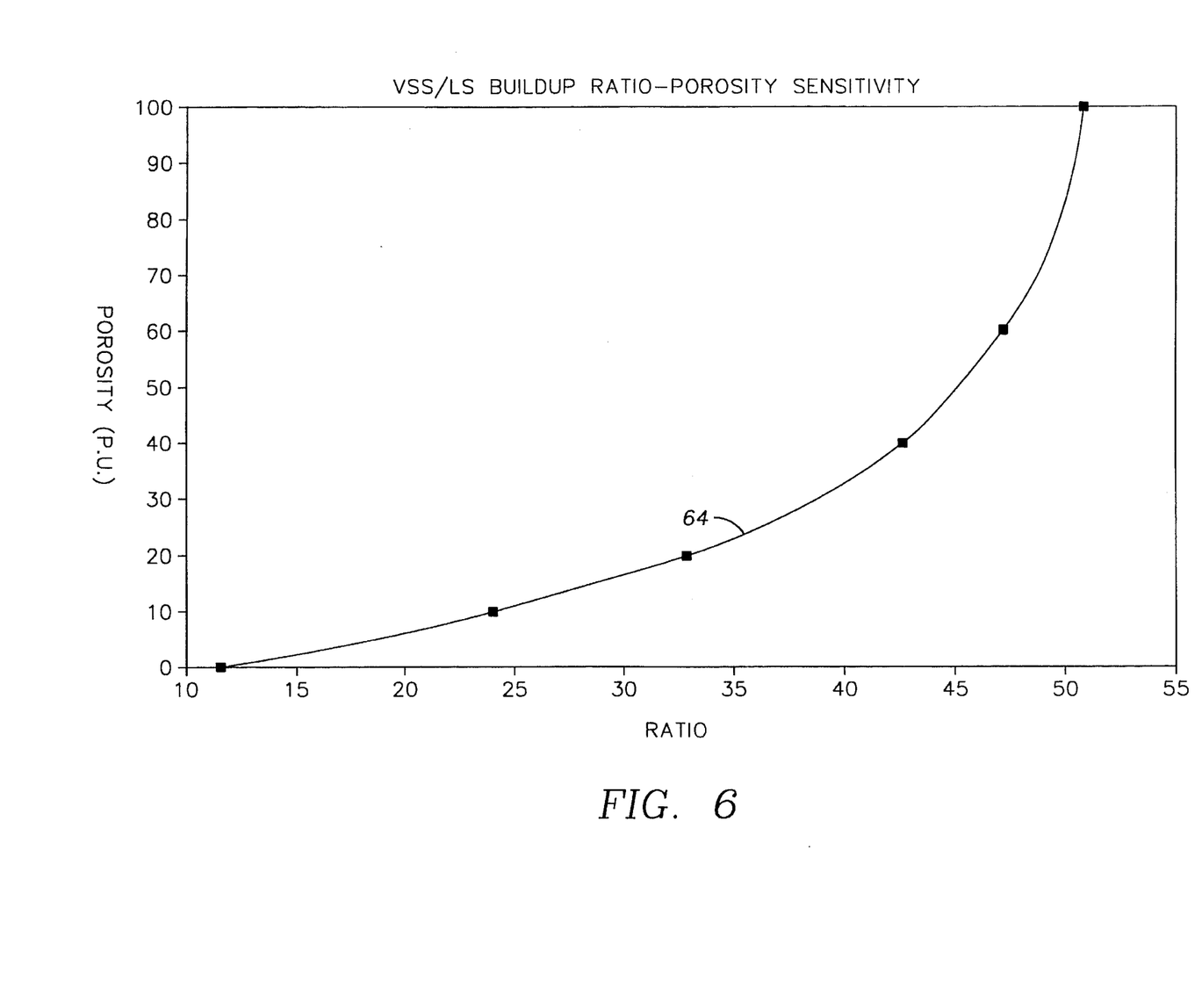
FIG. 6 shows an empirical relationship of a ratio of VSS to a long-spaced (LS) burst count ratio compared with porosity.

Apparent formation porosity is calculated from the VSS/LS ratio in the burst interval by using an empirical relationship such as that displayed graphically n FIG. 6.

Tool standoff is determined by application of the relationship described in equation (1) using the VSS/SS ratios from the burst and decay periods.

VSS/LS and VSS/SS ratios for the burst periods are corrected for tool standoff, and are corrected for fluid salinity and wellbore diameter using empirically determined relationships such as those displayed graphically in FIGS. 7, 9 and 10.

Formation lithology is determined by cross-plot of the environmentally corrected VSS/LS and VSS/SS count ratios.

Optionally, the formation porosity determined from the VSS/LS ratio can be adjusted to reflect the formation lithology previously determined, and the apparent porosity can be corrected for the tool standoff previously determined.

Those skilled in the art will be able to devise other methods and apparatuses for determining formation porosity which do not depart from the spirit of the invention disclosed herein. The invention should be limited in scope only by the claims appended hereto.

What is claimed is:

1. A method of determining porosity of an earth formation penetrated by a wellbore comprising the steps of:

irradiating said earth formation with bursts of fast neutrons emanating from a source inserted into said wellbore;

counting epithermal neutrons at a first detector axially spaced apart from said source so as to be primarily responsive to a neutron output rate of said source, said step of counting epithermal neutrons time-divided into buildup periods each contemporaneous with one of said bursts and decay periods each occurring between cessation of one of said bursts and initiation of a successive one of said bursts;

counting epithermal neutrons at a second detector during said buildup periods and during said decay periods, said second detector axially spaced apart from said source and radially displaced towards a wall of said wellbore so as to be responsive to epithermal neutrons entering said second detector from said formation, said second detector axially spaced so as to have response relatively insensitive to a lithology of said earth formation;

counting epithermal neutrons at a third detector during said buildup periods and during said decay periods, said third detector axially spaced apart from said source and radially displaced towards said wall so as to be primarily responsive to epithermal neutrons entering said third detector from said earth formation, said third detector axially spaced apart from said source so as to have response partially sensitive to said lithology;

calculating a first ratio of counts of said first detector to counts of said second detector counted during said buildup periods;

calculating a second ratio of counts of said first detector to counts of said second detector counted during said decay periods;

calculating a third ratio of counts of said first detector to counts of said third detector counted during said buildup periods;

calculating said porosity from said third ratio;

calculating a tool standoff from said first ratio and said second ratio;

adjusting said first ratio and said third ratio for a diameter of said wellbore and salinity of a fluid in pore spaces of said formation by a predetermined relationship; and determining said lithology by comparison of said adjusted first ratio and said adjusted third ratio.

2. The method as defined in claim 1 further comprising the step of adjusting said porosity as determined from said third ratio for effects of said lithology as determined by said step of comparison.

3. The method as defined in claim 1 further comprising the step of adjusting said porosity determined from said third ratio for effects of said tool standoff as determined by said step of calculating tool standoff.

4. An apparatus for determining porosity of an earth formation penetrated by a wellbore, comprising:

an elongated housing adapted for traversing said wellbore;

a source of fast neutrons disposed within said housing, said source adapted to irradiate said formation with bursts of last neutrons;

a first epithermal neutron detector disposed within said housing and axially spaced apart from said source so as to be primarily sensitive to a neutron output level of said source;

a second epithermal neutron detector disposed within said housing, said second detector axially spaced apart from said source and radially displaced towards a wall of said wellbore so as to be primarily sensitive to epithermal neutrons entering said housing from said earth formation, said second detector axially spaced apart from said source so as to be substantially insensitive to a lithology of said formation;

a third epithermal neutron detector disposed within said housing, said third detector axially spaced apart from said source and radially displaced towards said wall of said wellbore so as to be primarily sensitive to epithermal neutrons entering said housing from said earth formation, said third detector axially spaced apart from said source so as to be partially sensitive to said lithology;

a moderator filling substantially an entire internal volume of said housing between said detectors; and means for counting detections made by said first, said second and said third detectors during buildup time intervals contemporaneous with said bursts and detections made during decay time intervals each occurring between termination of one of said bursts and initiation of a successive one of said bursts.

5. The apparatus as defined in claim 4 wherein said first, said second and said third detectors each comprise a helium-3 proportional counter.

6. The apparatus as defined in claim 5 wherein said first, said second and said third detectors further comprise cadmium metal foil substantially surrounding each one of said helium-3 proportional counters.

7. The apparatus as defined in claim 4 wherein said moderator comprises a material having a high neutron scattering cross-section.

8. The apparatus as defined in claim 7 wherein said material comprises polypropylene.

9. The apparatus as defined in claim 4 further comprising means for urging said housing into contact with said wall of said wellbore.

10. The apparatus as defined in claim 9 wherein said means for urging comprises a bowspring attached to said housing.

11. A method of determining porosity of an earth formation penetrated by a wellbore comprising the steps of:

irradiating said earth formation with bursts of fast neutrons emanating from a source inserted into said wellbore;

counting epithermal neutrons at a first detector axially spaced apart from said source and radially displaced towards a wall of said wellbore so as to be responsive to epithermal neutrons entering said first detector from said formation, said first detector axially spaced so as to have response relatively insensitive to a lithology of said earth formation, said step of counting epithermal neutrons time-divided into buildup periods each contemporaneous with one of said bursts and decay periods each occurring between cessation of one of said bursts and initiation of a successive one of said bursts;

counting epithermal neutrons at a second detector during said buildup periods and during said decay periods, said second detector axially spaced apart from said source and radially displaced towards said wall so as to be primarily responsive to epithermal neutrons entering said second detector from said earth formation, said second detector axially spaced apart from said source so as to have response partially affected by said lithology;

normalizing numbers of counts counted by said first detector and said second detector for changes in a neutron output rate of said source thereby generating normalized counts for said first detector and said second detector;

calculating said porosity from said normalized counts of said second detector counted during said buildup periods;

calculating a tool standoff by cross-comparing said normalized counts of said first detector counted during said buildup periods and during said decay periods;

adjusting said porosity and said tool standoff for a diameter of said wellbore and salinity of a fluid in pore spaces of said formation by a predetermined relationship; and determining said lithology by cross-comparison of said adjusted tool standoff and said adjusted porosity.

* * * * *